United States Patent [19]
Boyes et al.

[11] Patent Number: 6,039,767
[45] Date of Patent: *Mar. 21, 2000

[54] BLENDED DYES AND PROCESS FOR DYEING POLYPROPYLENE FIBERS

[75] Inventors: Geoffrey E. Boyes, Roanoke, Va.; Michel A. Herlant, Charlotte, N.C.

[73] Assignee: Equistar Chemicals, LP, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/858,739

[22] Filed: May 19, 1997

[51] Int. Cl.$^7$ .................................. D06P 3/79; D06P 1/16
[52] U.S. Cl. ........................... 8/400; 8/638; 8/928; 8/513
[58] Field of Search ................................ 8/400, 513, 928, 8/638

[56] References Cited

U.S. PATENT DOCUMENTS

| | | |
|---|---|---|
| 3,953,168 | 4/1976 | Fabbri et al. . |
| 3,966,399 | 6/1976 | Sato et al. . |
| 3,989,449 | 11/1976 | Dixon et al. . |
| 4,125,371 | 11/1978 | Beutler et al. . |
| 4,185,959 | 1/1980 | Imada et al. ............... 8/638 |
| 4,199,813 | 4/1980 | Carbonell et al. . |
| 4,218,217 | 8/1980 | Redd, Jr. . |
| 4,255,154 | 3/1981 | Zurbechen et al. . |
| 4,286,961 | 9/1981 | Buser et al. . |
| 4,351,641 | 9/1982 | Tymon . |
| 4,362,530 | 12/1982 | Gross et al. . |
| 4,432,770 | 2/1984 | Hasler et al. . |
| 4,439,207 | 3/1984 | Altermatt et al. . |
| 4,464,180 | 8/1984 | Baumann . |
| 4,516,979 | 5/1985 | Baumann . |
| 4,557,730 | 12/1985 | Bennett et al. . |
| 4,579,561 | 4/1986 | Rowe et al. . |
| 4,645,510 | 2/1987 | Hasler et al. . |
| 4,801,303 | 1/1989 | Carlough et al. . |
| 4,840,643 | 6/1989 | Rowe . |
| 5,092,905 | 3/1992 | Doré . |
| 5,196,031 | 3/1993 | Hook . |
| 5,294,231 | 3/1994 | Palacin . |
| 5,420,254 | 5/1995 | Altermatt et al. . |
| 5,468,259 | 11/1995 | Sheth et al. . |
| 5,484,456 | 1/1996 | Hiuke et al. . |
| 5,550,192 | 8/1996 | Sheth et al. . |
| 5,576,366 | 11/1996 | Sheth . |

OTHER PUBLICATIONS

Article: "Dyeable Polyolefins, The New Frontier" by Michel A. Herlant, 1995.

*Primary Examiner*—Margaret Einsmann
*Attorney, Agent, or Firm*—Browning Bushman

[57] ABSTRACT

An improved method of dyeing a polyolefin material, and preferably a polypropylene based fiber, involves a disperse dye mix including a selected plurality of disperse dyes from the same primary color group. Each dye within the mix and the concentration of each dye within the mix is selected by testing individual disperse dye solutions with an undyed sample and determining the maximum dye concentration which will produce an acceptable crocking test for that dye. A plurality of disperse dyes within the mix are each at a concentration of at least 75% of the maximum dye concentration for that individual dye. The selected dye mix is used to prepare a disperse dye mix solution which is then contacted with the polyolefin material to reliably dye the material without fastness problems. A red dye mix, a blue dye mix, and the yellow dye mix may each be prepared and may each be separately used to dye polypropylene fibers with relatively dark shade without crocking problems. Different proportions of each of the three dye mixes may be used to dye polypropylene fibers at various selected shades and color depths.

35 Claims, 4 Drawing Sheets

BLENDED DYES AND PROCESS FOR DYEING POLYPROPYLENE FIBERS

FIELD OF THE INVENTION

The present invention relates to dye blend compositions and to a method of selecting dyes suitable for dyeing polyolefin materials, and particularly for dyeing polypropylene fibers. According to the method of the invention, polypropylene fibers may be reliably dyed at atmospheric pressure, and the dyed fibers exhibit good fastness. The desired dye may be blended from separate compositions within a particular primary color group and each consisting of a plurality of selected dyes at selected ratios within the dye mix, thereby allowing for the dyeing of polypropylene fibers at various shades and color depths.

BACKGROUND OF THE INVENTION

Homopolyester fibers can be readily dyed with various types of dyes, and various dyes and dye compositions have been devised which are particularly suited for dyeing polyester fibers. Exemplary patents directed to dye mixtures and compositions for dyeing polyester fibers are U.S. Pat. Nos. 3,966,399, 3,989,449, 4,362,530, 4,516,979, 5,092,905, and 5,420,254. Disperse dyes may be conventionally applied to polyester fibers utilizing either a bath process or a printing process, as disclosed in U.S. Pat. No. 4,464,180. Particular problems are sometimes associated with dyeing polyesters with a selected yellow color shade, and various technology is particularly directed to this problem, as disclosed in U.S. Pat. No. 4,439,207. U.S. Pat. No. 4,840,643 discloses a trichromatic dye combination suitable for continuous dyeing of polyester fibers for allegedly resulting in excellent fastness properties.

Various processes have been utilized for dyeing both polyester fibers and polyamide fibers which are commonly used in the carpeting industry. U.S. Pat. Nos. 3,953,168, 4,125,371, 4,199,813, 4,218,217, 4,255,154, 4,579,561, 4,801,303, 5,196,031, and 5,294,231 each teach variations of techniques and processes for dyeing polyester or polyamide fibers. U.S. Pat. No. 4,185,959 discloses a technique for dyeing polyester fibers in a dye bath containing at least nine disperse dyes having different chemical structures. U.S. Pat. Nos. 4,645,510 and 5,484,456 are directed to dyeing methods particularly designed for dyeing cellulose fibers.

Various techniques and dyes have been used for improving the light fastness of dyed polyester fibers. U.S. Pat. No. 4,557,730 discloses dyes and a dyeing method particularly suitable for dyeing polyester materials used in the automotive industry. U.S. Pat. No. 4,351,641 is directed to a technique for the continuous dyeing of pile fabrics, such as carpets and upholstery fabrics, which exhibit uniform shade in the cross machine direction. Various types of polyester and cellulose dyed fibers may be subjected to a reduction clearing technique after dyeing in order to remove disperse dye molecules which have not fully diffused in the fiber. U.S. Pat. No. 4,286,961 exemplifies technology directed to reduction clearing of disperse dyes.

When dyeing polyester fibers with disperse dyes, several dyes rather than a single dye have been used to obtain very dark shades. Since each dye has its own saturation rate at which the rate of dye uptake is slower and lower, the increase in depth slows down in relation to the amount of dye available in the dye bath. A depth of shade that is much darker can be obtained with several dyes in a shorter time than when only one dye is used. Three or four dyes may thus be combined into a blended dye product and applied to the polyester to result in a darker shade at lower concentration levels and at a faster dyeing rate than one would have used if only one dye were employed in the dyeing process. If the desired yields cannot be obtained when dyeing polyester with disperse dyes at atmospheric temperatures, polyester can be readily dyed under high pressure and temperature. More than 90% of polyester fibers and its blends with cellulose fibers are dyed under pressure (e.g., 250° F. to 270° F.).

Deep shades of polyester are conventionally reduction cleared when needed. This process involves the treatment of the dyed fiber in an alkaline reduction bath, during which the dyes are chemically destroyed. Since the bulk of the color is trapped deep within the fiber, excellent crock fastness can still be achieved after reduction clearing the dyed polyester fibers.

Use of polypropylene in the manufacture of carpets has undergone a dramatic growth since 1980s. Polyolefins, and particularly polypropylene, are hydrophobic and difficult to dye with disperse dyes since they lack dye sites to which dye molecules may become attached. Van der Waals forces and hydrogen bonds are often given as the reason for the dyes to have affinity for the polymers. Polyolefins are also not dyeable by acid dyes since they lack basic sites with which the dye may form a salt bond. Those skilled in the art of manufacturing polypropylene fibers have long recognized that the inability to successfully dye polypropylene has limited its growth, particularly to uses where color design and flexibility are required. Accordingly, much of the polypropylene currently used in the carpet industry is colored with pigments during the extrusion process.

In the early 1990s, Lyondell Petrochemical Company developed an enhanced polypropylene resin which was successfully used to manufacture fibers suitable for the carpet industry. The new polypropylene-fibers could be disperse dyed under atmospheric pressure and conventional dyeing temperature conditions. This dyeable polypropylene composition is disclosed in U.S. Pat. Nos. 5,468,259, 5,550, 192, and 5,576,366, and has been introduced by Lyondell under the KROMALON™ name. While polypropylene fibers developed with this technology exhibit tremendous promise, fibers and materials manufactured with this new polypropylene composition have experienced problems with respect to dyeability and fastness.

Numerous disperse dyes which are commonly used to successfully dye polyester, polyamide and acetate materials have not performed well when dyeing KROMALON. Some of these dyes do not build well into darker shades and other have insufficient fastness properties. Polyester and polyamide fibers may be easily dyed with disperse dyes since there is mechanical bonding of the dye to the expanding fiber. In polypropylene, this mechanical bonding does not occur since polypropylene does not absorb well and swell in water. The dye saturation level when dyeing polypropylene is thus very low compared to the dye saturation level when dyeing polyester, and dyed polypropylene generally exhibits poor crock fastness and rubbing fastness compared to dyed polyester. In general, the saturation curve for KROMALON is thus markedly different than the saturation curve for polyesters and polyamides.

Since the saturation concentration from many dyes is quite low when dyeing KROMALON compared to the saturation concentration for the same dyes on polyester, attempts to dye KROMALON in a very dark shade frequently result in 50% or more of the dye not exhausting on the KROMALON material, thereby resulting in dyed fibers which have very poor crock and rubbing fastness. While polyesters may be conventionally dyed to very dark depths with disperse dyes, extreme difficulties are thus encountered when trying to reach the same dark depths with adequate fastness when dyeing KROMALON.

As noted above, polyester fibers which are disperse dyed may be easily reduction cleared to remove the loose dye stuff. Reduction clearing of polyester typically occurs at 160° F. to 180° F. utilizing mixture of caustic soda and sodium hydrosulfite. This same reduction clearing if performed on polypropylene would adversely alter the shade to a significant degree. The reductive force of the treatment of polyester happens only on the outer skin of the fiber. Polypropylene is not as dense as polyester, and is thus more porous and accessible so that the reduction treatment penetrates inside the fiber, thereby destroying the color.

KROMALON accordingly has a dye fixation mechanism which is markedly dissimilar to the dye fixation mechanism used to dye both polyesters and polyamides. High temperature dyeing of KROMALON does not seem to result in the significant improvement in color yield which is experienced when dyeing polyester at high temperatures. Dyeing of polyesters is frequently enhanced with the use of carriers. Typical carriers are organic compounds, such as butyl benzoate, bi-phenyl, trichlorobenzene, that can be emulsified in water and thus permit faster dyeing. Carriers penetrate the fiber, often swelling the fiber and aiding the passage of the disperse dye across the dye dispersion fiber interface and into the fiber. Carriers commonly used with disperse dyes for dyeing polyester are not effective to any significant degree on the KROMALON fibers, and those that help have other limitations such as a drastic drop in light fastness or, because of their strong and offensive odors, cannot be used for many applications.

The disadvantages of the prior art are overcome by the present invention. An improved process is hereinafter disclosed for selecting dyes, and for combining disperse dyes which are able to reliably dye polyolefins, and particularly polypropylene. The improved method of dyeing KROMALON according to this invention allows the dye operator to obtain the desired shade and darkness of the dyed substrate without the dyed fibers thereafter exhibiting crocking problems.

SUMMARY OF THE INVENTION

According to the present invention, different disperse dyes are selected and placed in combination with other disperse dyes as a function of their maximum concentration prior to exhibiting crocking problems. Numerous red disperse dyes may thus be combined to form a red dye composition, numerous blue dyes combined to form a blue dye composition, and numerous yellow dyes combined to form a yellow dye composition. Each dye is used at a concentration less than its maximum concentration level which may result in crocking. The combined dyes desirably "stack" or build to result in a dark shade, but do not also "stack" to result in a dye combination which exhibits crocking. Each dye is generally selected in the linear area of a K/S v. dye concentration curve, which provides conforming data to that obtained by the crocking test.

According to the present invention, crocking tests on individuals dyes are thus used to determine the maximum concentration at which the dye may be used prior to resulting in a crocking problem when dyeing KROMALON. Once this maximum dye concentration value is obtained, the dye may be used at that concentration and stacked or combined with other dyes without resulting in a crocking problem. Each of the selected dyes within the dye composition thus acts substantially independently of other dyes, thereby allowing the dyes to build without creating crocking problems. A dark dye color may thus be obtained by building up various dyes. KROMALON fibers may be reliably dyed at atmospheric pressure, thereby avoiding the high cost of pressurized dyeing equipment.

The present invention provides a technique for dyeing polypropylene economically by enabling various shades and colors to be dyed without exhibiting fastness problems. A maximum dye concentration for each dye is determined as a function of the crocking tests. Very dark shades of polypropylene may be dyed with good fastness using a dye mixture consisting of various dyes each within the same primary color group, e.g., red, blue or yellow. Rather than merely using one yellow, one red, and one blue dye to obtain a desired shade, the invention uses a combination of yellow dyes to result in a yellow dye mixture, a combination of red dyes to result in a red dye mixture, and a combination of blue dyes to result in a blue dye mixture. Several different dyes may thus be used to make up each dye mixture, and each dye mixture may then be used to dye a relatively dark shade. Four or more different dyes may thus be selected from the same primary color group to obtain a specific color formulation. Each dye within the dye mixture is utilized at a concentration level at which that dye builds up with a high degree of exhaustion, and most importantly, without resulting in a crocking problem. Very dark dyeing of KROMALON is thus possible with good fastness.

The individual dyes forming the dye mixture are selected as a function of their individual performance when they are used alone when dyeing an undyed KROMALON sample. In general, each dye is selected at its maximum concentration which would result in a crock fastness value of 4–5, which is considered an acceptable crock fastness. When combined, each dye exhausts at its own rate, substantially unhindered by the other dyes. One can thus obtain dark shades of dyed polypropylene at atmospheric pressures, and without crocking problems.

For optimum results, specific dyes are selected which have good buildup and high K/S values. The selected dyes ideally have good light fastness, good fastness to high humidity ozone and nitrogen oxides, and good crock fastness, with a minimum rating of 4–5 at dark depths. Selected dyes in the dye mixture of a specific color may be complementary in that one dye has good light fastness but mediocre buildup, while another dye builds very well but lacks acceptable light fastness when used by itself. A combination of both dyes, however, can result in the final product having significantly better dyeing characteristics than each of the individual dyes. The blended dyes forming the dye mixture have excellent build properties with acceptable fastness in dark shades, and also sufficient light fastness in the lighter depths.

A blue dye composition, a red dye composition, and a yellow dye composition may thus be generated according to the process of the invention. These three dye compositions or mixes may then be used at different mix percentages in the dyeing process to obtain the desired color and shade.

It is an object of the present invention to provide an improved method of dyeing a polyolefin which can result in a desired dark shade without the dyed polyolefin exhibiting a significant crocking problem.

It is another object of the present invention to improve the process for commercially dyeing polyolefins by providing various dye compositions each in a primary color group (e.g., red, yellow, and blue) with each of two or more dye concentrations within the composition being determined as a function of its crocking characteristic independent of other dyes within the same composition.

Yet another object of the invention is to significantly improve the commercial success of dyed polyolefins by providing a process for reliably dyeing the polyolefins at atmospheric pressure.

A significant feature of the present invention is that polypropylene fibers may be reliably dyed and used to fabricate carpet with the fibers exhibiting good fastness properties.

It is a further feature of the invention that an improved process is provided for dyeing polypropylene with selected disperse dyes, resulting in an economically dyed polypropylene material.

Still another feature of the present invention is that polypropylene fibers may be reliably dyed in various desired shades using commercially available disperse dyes.

An advantage of the present invention is that the marketability of polypropylene fibers will be significantly enhanced.

Another advantage of this invention is that polypropylene fiber may be reliably dyed either before or after the fiber is spun into yarn. The use of a reasonable amount of fiber finish or fiber lubricant on the fiber, which is desirable for many applications, does not prevent the reliable dyeing of dark colors.

Another significant advantage of the invention is that only a few different primary color mixes may be provided to a dye operator who then may reliably dye the polyolefin in either light or dark colors and at numerous different shades by using different amounts of the mixes in quantities set forth in a color chart.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
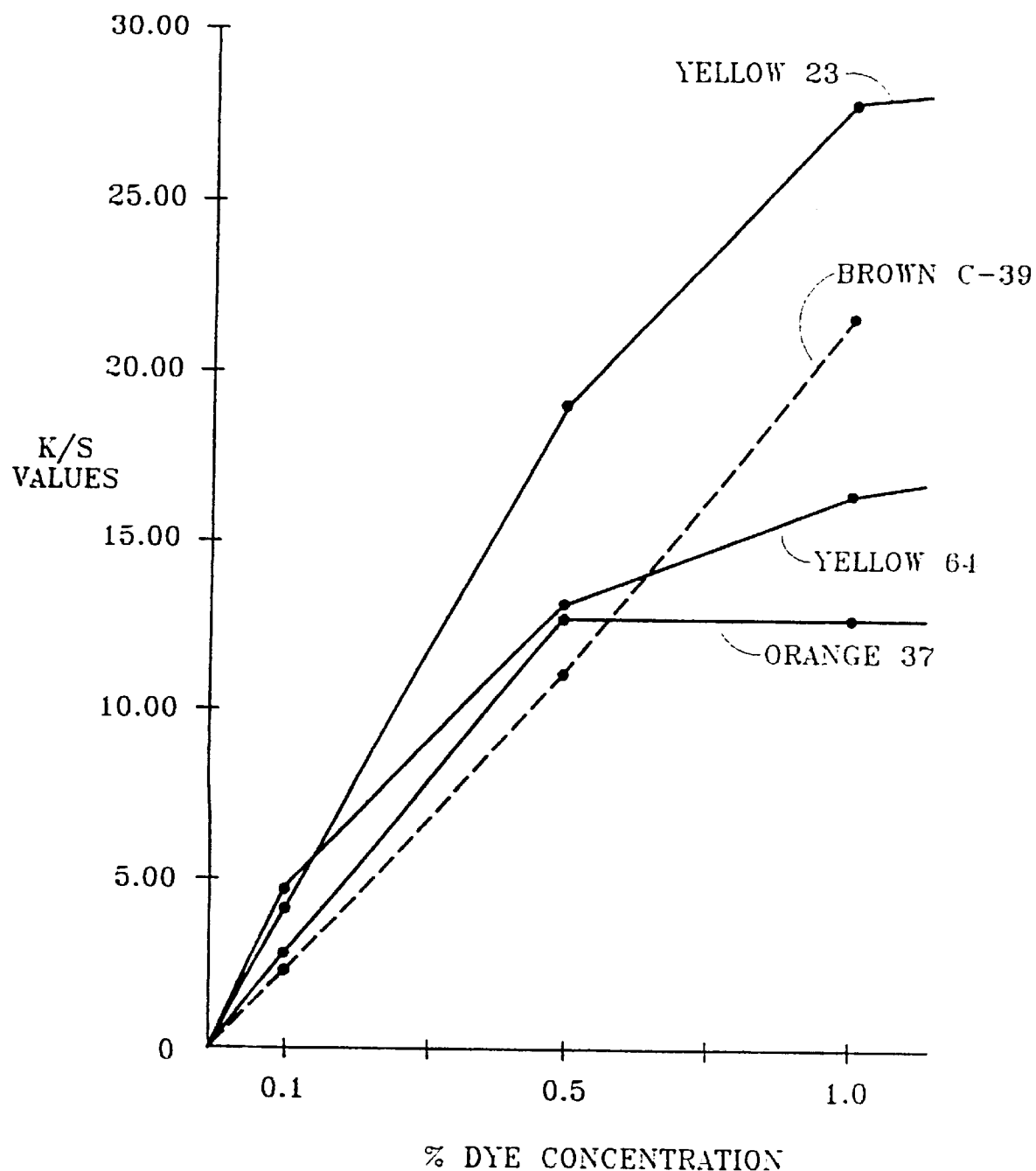
FIG. 1 graphically illustrates K/S values as a function of dye concentration for four different yellow disperse dyes.

According to the present invention, a red dye combination, a blue dye combination, and a yellow dye combination are each made, with each dye combination including a plurality, and preferably at least four or more, selected dyes from each primary color group. Individual dyes which are included within the combination are selected by a dye screening process.

Disperse dye candidates for including in a combination may be initially screened by performing a quick 0.1% concentration dyeing of a sample KROMALON material. The rinse dye may then be exhausted on nylon or polyester. If the rinse water is deeper than the dyed sample, then the dye may be considered uneconomical. For the dye candidates which gave at least 80–100% yield at the 0.1% concentration, further dyeings of polypropylene samples were done at higher concentration levels, e.g., 0.25, 0.50 and 1.00%. For KROMALON samples which had no lubricant applied to the fibers, a dry crocking test was done after conventional air drying of the fibers. For polypropylene samples which has 0.5% lubricant applied to them, the samples were dried in an over for 48 hours at 120° F. At the end of the 48 hours, the dry crock test on those samples was then performed. The maximum concentration for each dye (depends on whether the fibers did or did not have a lubricant) was established at the point where the crock went from a value of 4–5 to a value of 4. Three acceptable "workhorse" dyes were obtained: disperse red 60, disperse yellow 64, and disperse blue 148. (All dyes listed generally by color and number shall be understood to refer to the Color Index name.)

The Grey Scale Grading System was used for crock testing the samples, in which fastness characteristics were rated on a scale of from 1 to 5, with 5 being indicative of no change, 4 being indicative of a slight change, 3 being indicative of noticeable change, 2 being indicative of a significant change, and 1 being indicative of a severe change. Ratings such as 3–4 obviously could not be fairly characterized as a slight change, but were better than those characterized with a noticeable change. In general, the rating of 4–5 or 4 for most fibers is acceptable, and a rating of 3–4 for some fibers is borderline acceptable.

Tests were conducted with numerous disperse dyes to determine the maximum concentration of each individual dye before crocking, i.e., before the crocking value went from 4–5 to 4. When dye mixtures of up to 12 different dyes with each dye below its maximum concentration before crocking from the same color group were then mixed, the tests confirm that when blended together each dye in the blend performed independently of the other dyes and resulted in a good color build without crocking.

Figure 2:
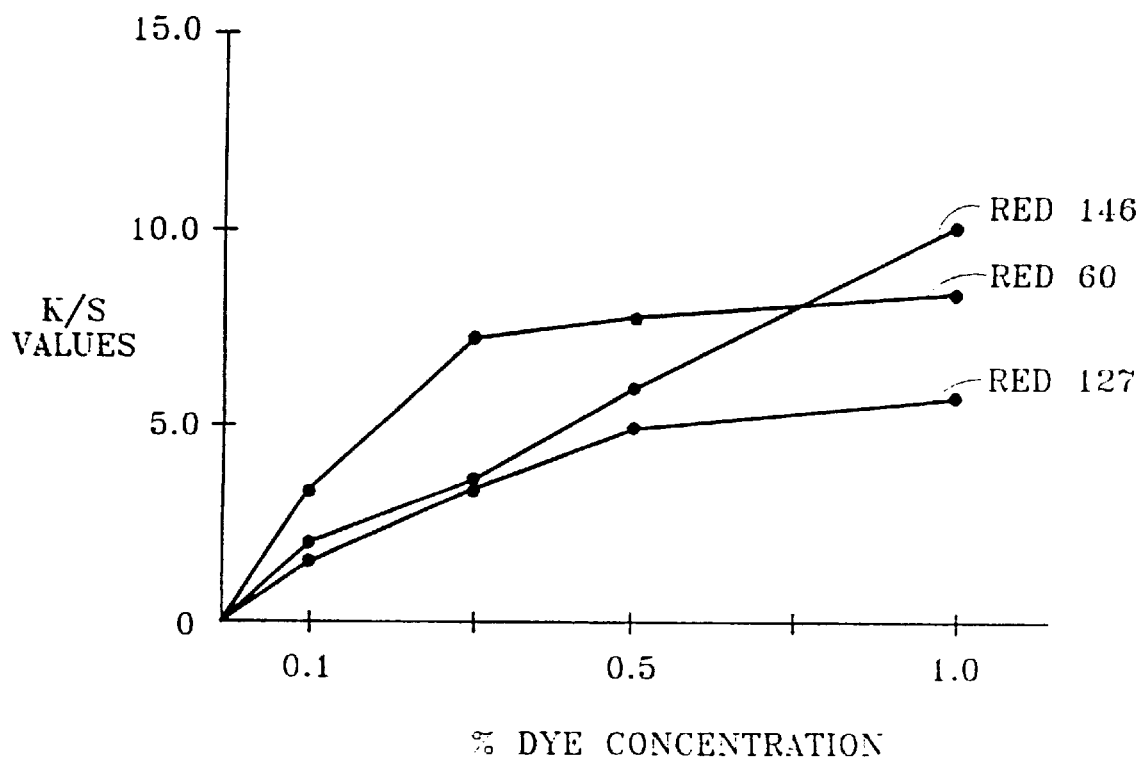
FIG. 2 graphically depicts K/S values as a function of dye concentration for three different red disperse dyes.

FIGS. 1 and 2 depict K/S v. concentration values for different disperse dyes. The four dye curves provided in FIG. 1 are each for a dye from the yellow primary color group, and the three dye curves in FIG. 2 are each for a dye from the red primary color group. These K/S v. concentration curves for specific disperse dyes when dyeing undyed polypropylene samples provide useful information regarding the likely maximum dye concentration which may be used for a specific disperse dye which will result in an acceptable crocking test, but could not be used as a substituted for the actual crocking test. In general, however, the maximum acceptable dye concentration values which will result in acceptable crocking tests will be comfortably within the linear portion of the curve, as discussed further below.

Figure 3:
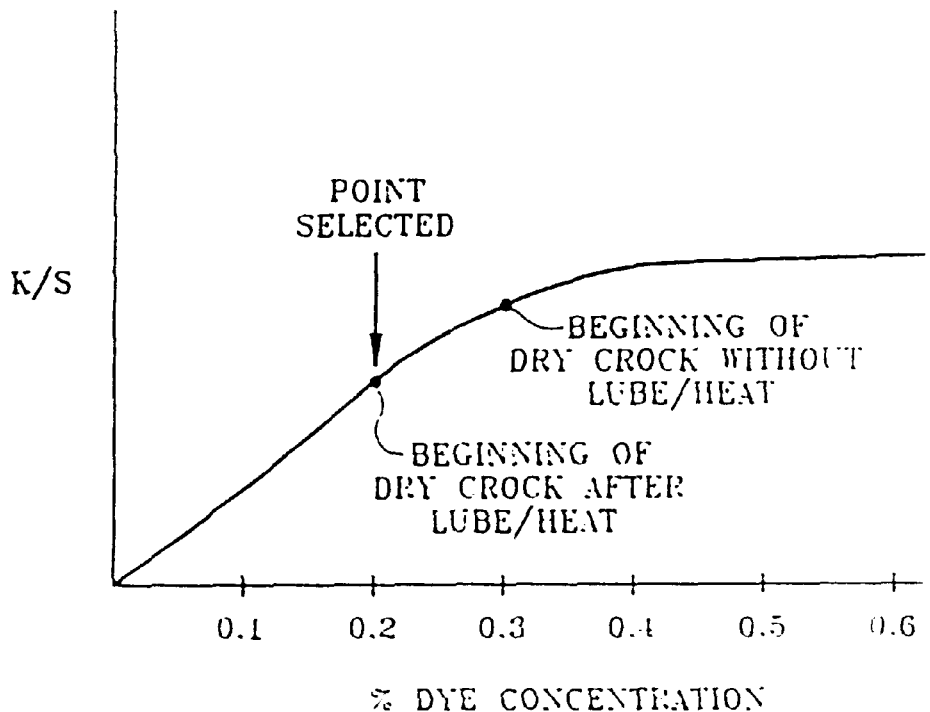
FIG. 3 depicts K/S values as a function of dye concentration for a specific disperse dye, and also graphically depicts dry crocking values after dyeing and normal air drying and also dry crocking values for lubricated fibers after drying for 48 hours at an elevated temperature of 120° F.
Figure 4:
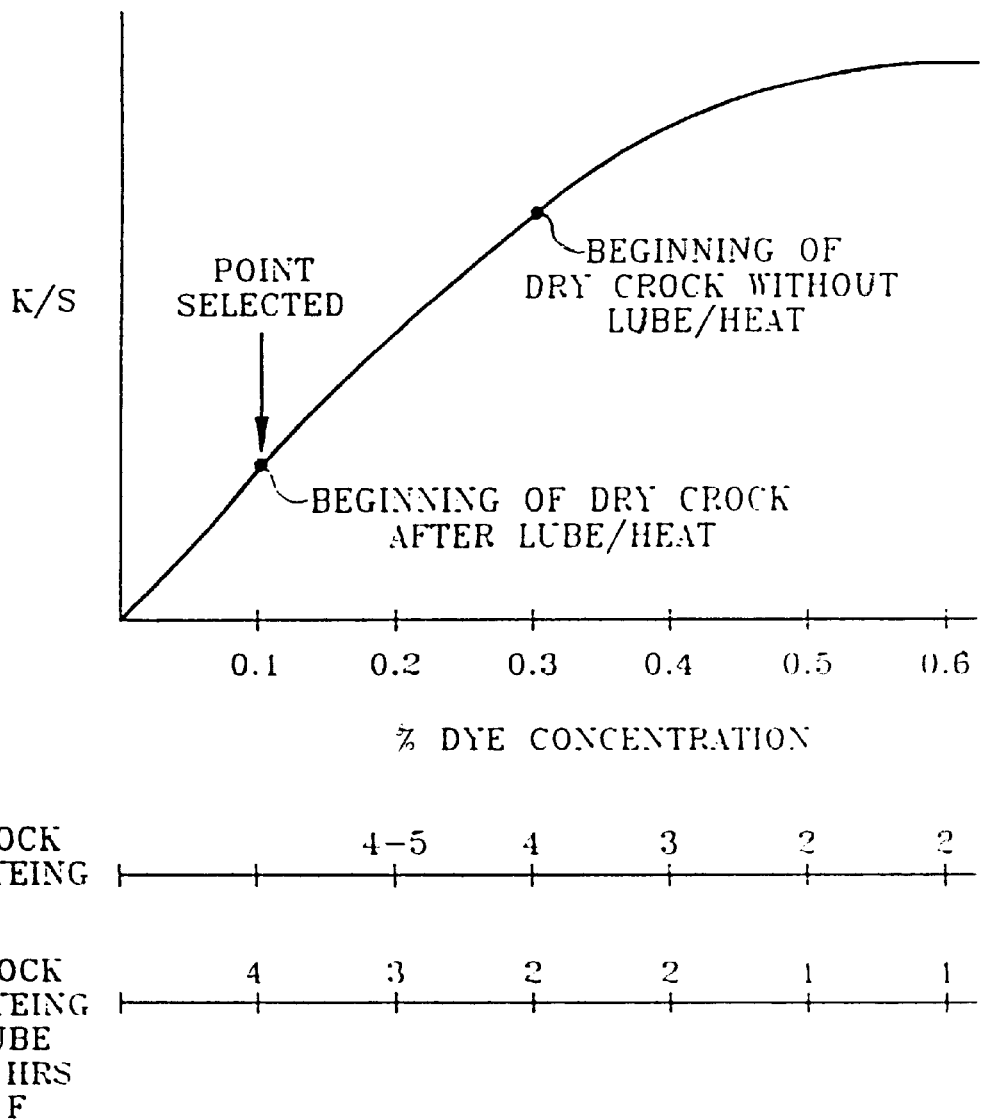
FIG. 4 depicts the same information as FIG. 3 for another disperse dye.

FIGS. 3 and 4 further illustrate the concept of the present invention, and specifically plot dye K/S values as a function of dye concentration. K/S values are commonly used measurements which indicate color yield. K is the coefficient of absorption, and S is the coefficient of scattering. K/S values are typically plotted as a function of increasing dye concentration to depict the apparent color yield or depth of color as a function of dye concentration. More specifically, $K/S=(1-R)^2 \div 2R$, where R is a reflectance value. The curves do not teach where the maximum dye concentration is that will result in an acceptable crocking test. Only by conducting the tests and actually checking crock values can the maximum concentration before crocking for a specific dye be determined. The K/S values curves for specific dyes do help, however, in predicting likely dye candidates and estimated maximum concentration values. Specific crocking tests were necessary to determine the maximum concentration at which each dye could be used in the specific mixture without that dye creating a crocking problem.

Referring specifically to FIG. 3, maximum concentration for the specific dye for the fibers begin to exhibit some crocking (4–5 crocking value) is approximately 0.3%, while the same dye could only be used in a concentration of less than approximately 0.2% to result in an acceptable crocking value of 4 if lubricant was applied to the dye. Accordingly, a safe limit for this dye at a concentration of approximately 0.15% could be determined as a function of these tests, regardless of whether the polypropylene material had or did not have a lubricant. In general, a dye concentration closer to 0.2% could be successfully used for this dye if little lubricant was used on the polypropylene, or if the lubricant which was used had a minimal affect on crocking. Obviously a dye concentration of about 0.25% could be used to dye polypropylene with this dye and not exhibit crocking if no lubricant were used. It should be understood that all dye concentration values as used herein are the percent of dye to the weight of the material dyed, which is a standard expression of dye concentration.

FIG. 4 provides similar data for another dye. If no lubricant were used on the sample, dye concentration could be increased to about 0.3% while still obtaining an acceptable crocking value of 4. If a lubricant was used, however, the same acceptable crocking value of 4 could only be maintained up to a dye concentration of about 0.1%. Accordingly, the data in FIG. 4 shows that, for this dye, the maximum concentration at which this dye could be combined in a mix would be 0.1% if the dye mixture was used to dye polypropylene which had a lubricant. A higher concentration could be used if the same mixture was used to dye polypropylene which did not have a lubricant. In many cases, a universal dye mix is desired for dyeing various types of polypropylene with various or no lubricants on the fibers. Accordingly, the 0.1% concentration for this dye could be used in such a universal dye mix.

As indicated above, each disperse dye has its own specific fastness characteristics when applied to polypropylene. The following table provides specific information for five dyes, including the percent dye concentration at which crocking is equal to 4, light fastness characteristics, high humidity ozone/NOx characteristics, and preferred concentration. The high humidity ozone and high humidity NOx tests represent two-cycle tests.

TABLE I

| Dye | % Concentration at which crocking = 4 | 40 Hours Lightfastness | | | High Humidity Ozone/NOx | % Preferred Dye Concentration in Dye Mix |
| --- | --- | --- | --- | --- | --- | --- |
| | | Very Light | Light | Dark | | |
| A | 1.00 | Poor | OK | OK | OK/OK | 0.75 |
| B | 1.25 | OK | OK | OK | OK/OK | 1.00 |
| C | 0.70 | OK | OK | OK | OK/OK | 0.50 |
| D | 0.75 | Poor | Fair | OK | Poor/Poor | 0.50 |
| E | 1.00 | Poor | Poor | Poor | OK/OK | 0.50 |

Dye A is disperse blue 148. This dye is a tremendous builder, although crock fastness becomes unacceptable around 1% concentration. All other aspects of this dye are acceptable, except in very light depths. Dye B is a Terasil blue HLB and is a very good overall dye, except for buildup. Although not as powerful as Dye A, it is better than Dye C. Dye C is disperse blue 87, which has excellent light fastness, but is limited in its buildup characteristics. It stops building at around 0.75% and from 0.5 to 0.75% there is only a very limited increase in depth.

Dye D is disperse blue 118. This dye has limited build characteristics and fair light fastness when used by itself. Dye E is disperse blue 291, and is an outstanding dye with good atmospheric contaminant fastness, but poor light fastness. Using moderate amounts together with dyes A, B, C, the dye mixture results in acceptable light fastness. For dye D there is a risk when using too much in the mix that the resulting combination will exhibit poor light fastness and also poor ozone/NOx values.

The information provided in Table I indicates that five dyes may be used to form the dye mix for a specific blue dye color mix. Of the dyes which are included in this mix, both dyes A and B are selected at a concentration of at least 75% of the maximum concentration which will result in an acceptable crocking value of 4. Dye C is selected at a concentration for the mix which is only slightly less than 70% of the maximum concentration which will result in a crocking value of 4. Thus at least two or more of the dyes from this five dye blue mixture are selected at substantially its determined maximum dye concentration for each of these two dyes.

The other important point with respect to the data provided in Table I is that the preferred concentration of at least two of the dyes for the dye mix was selected to have approximately the same ratio to a maximum concentration for that dye. In other words, the preferred concentration for dye A is obviously 75% of its maximum concentration which will result in a crocking value greater than 4, while the selected concentration for dye B is 80% of its maximum concentration which result in a crocking value of 4. As noted below, the preferred concentration for dye C is approximately 70% of its maximum dye concentration which result in a crocking value>4. While the ratio of preferred concentration to maximum dye concentration is less for both dyes D and E, it may be seen from the above that, within an acceptable range of 10%, three of the five dyes have approximately the same ratio of a preferred concentration in the dye mix compared to the maximum concentration for each dye which will result in an acceptable crocking value. The above explanation is particularly important in view of graphs 3 and 4, and the desire to form an acceptable dye mix according to the present invention while minimizing the risks of any significant crocking problem. It may be seen that the five dyes which comprise the blue dye mix as shown in Table I have a combined concentration of 3.25%, which of course is significantly more than the concentration that any one of these dyes could be applied to the fiber without resulting in a significant crocking problem. Since the dyes in the dye mix build well for fastness properties but do not build to result in a crocking problem, the blend in Table I is thus suitable for dyeing polypropylene according to the present invention.

In another example, a red mix contains the following red dyes each in the percent concentration listed in the following table.

TABLE II

| Dye | Preferred Dye Concentration in Dye Mix |
|---|---|
| A | 1.00 |
| B | .25 |
| C | .50 |
| D | .75 |
| E | .50 |
| F | .25 |
| G | .125 |

Dye A is red 146, which results in a bright pink color and builds into a violet. Dye B is red 60, which is satisfactory up to 0.25% concentration, but does not build well beyond this concentration and results in poor crocking if this concentration level is increased. Dye C is red 127 which is a weak dye, and is less than one-half the strength of red 60. Dye D is red 338 which dyes a reddish-orange color and builds extremely well. This dye starts crocking, however, at concentrations above 0.50%. Dye E is red 50 which dyes with an orange hue. This dye stops building at about 0.55% concentration, and crocking is also a problem beyond this concentration. Dye F is red 13. This is an excellent dye builder, however, this dye has poor light fastness by itself. When used in combination with red 60 and below 0.25%, acceptable light fastness is obtained. Dye G is red 65 which has good light fastness but should not be used at concentrations higher than 0.125% because it tends to crock at higher concentrations. For each of the red and blue combinations disclosed above, dye concentrations in the aggregate were from 3.3 to 4.0% and resulted in very dark shades of polypropylene being dyed with good all around fastness. The sum of the dye concentrations for individual dyes which comprise a dye mix according to the invention will typically be above 2.5%, and typically in the range of from 3.0% to 4.5%. In each case, the sum of the dye concentrations for the individual dyes in the dye mix will be substantially greater than the determined maximum dye concentration for each of the individual dyes within the dye mix.

The following tables lists good dye candidates for obtaining a combination of yellow, red and blue dye mixes.

TABLE III

Primary Color Red, including Scarlets, Bordeaux and Violets

Disperse Red 60 (Intrasil Brilliant Red 2B 200%)
Disperse Red 50 (Intrasil Scarlet 2GH)
Disperse Red 146 (Intrasil Red BSE)
Disperse Red 127 (Dianix Red BN-SE)
Disperse Red 65 (Intrasil Red MG)
Disperse Red 86 (Terasil Pink 2GLA)
Disperse Red 191 (Intrasil Pink SRL)
Disperse Red 338 (Intrasil Red 4BY)
Disperse Red 302 (Terasil Pink 3G)
Disperse Red 13 (Intrasperse Bordeaux BA)
Disperse Red 167 (Foron Rubine S-2GFL)
Disperse Violet 26 (Intrasil Violet FRL)
Primary Color Blue Disperse Blue 60 (Terasil Blue BGE 200%)
Disperse Blue 291 (Intrasil Blue MGS)
Disperse Blue 118 (Terasil Blue GBT)
Terasil Blue HLB
Disperse Blue 87 (Intrasil Blue FGB)
Disperse Blue 148 (Palanil Darkblue 3RT)
Disperse Blue 56 (Intrasil Blue FBL)
Disperse Blue 332 (Bafixan Turquoise 2BL liq.)

TABLE III-continued

Primary Color Yellow, including Orange, Yellow Brown

Disperse Yellow 64 (Disperite Yellow 3G 200%)
Disperse Yellow 23 (Intrasil Yellow 5R)
Palanil Yellow HM
Disperse Brown 19 (Dispersol Yellow D-7G)
Disperse Orange 30 (Foron Yellow Brown S-2RFL)
Disperse Orange 41 (Intrasil Orange 4RL)
Disperse Orange 37 (Intrasil Dark Orange 3GH)
Disperse Yellow 3
Disperse Orange 30
Disperse Yellow 42
Disperse Orange 89
Disperse Yellow 235
Disperse Orange 3
Disperse Yellow 54
Disperse Yellow 233 ((Foron Yellow S-6GL)

Some dyes that were selected obviously build better than other. Other dyes have good all around fastness and minimum light rating of either 4 or ¾ after 40 SFU Xenon, a good crock fastness rating of 4–5, and a rating of ¾ for two cycles of high humidity ozone and high humidity nitrogen oxides. In selecting the proper dyes to optimize the positive aspect of each dye, one dye may be selected that builds well or another dye has good light fastness. Similarly, one can combine a dye with very good ozone and NOx fastness with a dye that doesn't have this same desired property. As an example, blue 87 and Terasil blue HLB have very good light fastness, but blue 87 does not build well. Blue HLB builds better but not as well disperse blue 148. This blue has very acceptable light fastness at concentration levels as low as 0.05%. A combination of these three dyes results in a mix with excellent all around buildup and fastness properties. One can now add to this mix blue 291, which is a very good builder, but has mediocre light fastness. A small or moderate amount of blue 291 gives additional boost to the buildup properties of this four dye mix, while still maintaining an adequate light fastness. This process can be expanded with the additional of other blue dyes. Each component contributes to achieving an adequate buildup with acceptable fastness.

Table IV depicts standard depths for dyes evaluated by exhaust dyeing on KROMALON. The standard depth information provided in a format is well recognized by those skilled in the art. Basically, it should be understood that a standard depth of, for example, 1/1 is one-half of the standard depth of 2/1. The standard depth of 1/10 is thus one-tenth the standard depth of 1/1. The information provided in Table IV provides, for specific disperse dyes, the standard depth obtainable at different dye concentrations, and in many cases the crocking value for that dye at the stated concentration. The information provided in Table IV, as with the K/S v. concentration values discussed above, provides very useful information for estimating which disperse dyes and the maximum concentration for each disperse dye which may be used to dye polypropylene without exhibiting crocking problems. The data in Table IV is thus useful in selecting disperse dyes for a dye mix and for estimating the maximum disperse dye concentration which will result in acceptable crocking for that individual dye, but again is not a substitute for an actual crocking test.

TABLE IV

Standard depths for dyes evaluated by exhaust dyeing on 100% KROMALON.
UPPER NUMBER IS % DYE CONCENTRATION; LOWER NUMBER IS CROCKING TEST VALUE

| STANDARD DEPTH | 1/50 | 1/25 | 1/20 | 1/12 | 1/10 | 1/6 | 1/5 | 1/3 | 2/3 | 1/1 | 2/1 | 2.5/1 | 3.5/1 |
|---|---|---|---|---|---|---|---|---|---|---|---|---|---|
| *Primary Color Red, including Scarlets, Bordeaux and Violets* | | | | | | | | | | | | | |
| Red 338 (Intrasil Red 4BY) | | | | 0.1 (5) | | | | 0.25 (4–5) | | 0.5 (3–4) | 1.0 (2) | | |
| Red 50 (Intrasil Scarlet 2GH) | | | | 0.1 (5) | | | | 0.25 (4–5) | | 0.5/1.0 (4)/(3–4) | | | |
| Red 127 (Intrasil Red BN-SE) | | 0.1 (5) | | 0.25 (4–5) | | 0.5 (4–5) | | 1.0 (4) | | | | | |
| Red 60 (Intrasil Red 2B 200%) | | | | 0.1 (5) | | 0.25 (4–5) | 0.5 (3) | 1.0 (2) | | | | | |
| Red 146 (Intrasil Red BSE) | | | | 0.1 (5) | | 0.25 (5) | | 0.5 (4–5) | | 1.0 (4–5) | | | |
| Red 65 (Intrasil Red MG) | | 0.1 (4–5) | | 0.25 (3–4) | | 0.5 (3) | | | | | | | |
| Red 302 (Terasil Pink 3G) | | | | 0.1 | | 0.25 | | | | | | | |
| Red 191 (Intrasil Pink SRL) | | 0.1/0.25 (5)/(5) | | | | | | | | | | | |
| Red 86 (Terasil Pink 2GLA) | | 0.1/0.25 (5)/(5) | | | | | | | | | | | |
| Red 167 (Foron Rubine S-2GFL) | | | | 0.1 (5) | | 0.25/0.50 (4–5)/(3–4) | | | | | | | |
| Red 13 (Intrasperse Bordeaux BA) | | | | 0.1 (5) | | 0.25 (4–5) | | 0.50 (4) | | 1.0 (3) | | | |
| Red Mix 2.25.97 | | | | 0.1 (5) | | | | 0.50 (5) | | 1.0 (5) | | 2.0 (4–5/5) | |
| *Primary Color Blue* | | | | | | | | | | | | | |
| Blue 118 (Terasil Blue GBT) | | 0.1 | | | | 0.5 | | 1.0 | | | | | |
| Blue 60 (Terasil Blue BGE 200%) | 0.1 | 0.5 | | | | | | | | | | | |
| Blue 291 (Intrasil Blue MGS) | | | | 0.1 | | | | 0.5 | | 1.0 | | | |
| Blue 56 (Intrasil Blue FBL) | | | 0.1 | | | redder 0.5 | | redder 1.0 | | | | | |
| Blue 64 (Intrasil Blue 4RL) | | 0.1 | | | | 0.5 | 1.0 | | | | | | |
| Blue 148 (Palanil Dark Blue 3RT) | | | | 0.1 | | | | | | 0.5 | 1.0 | 2.0 | |
| Blue 87 (Intrasil Blue FGB) | | | | 0.1 | | | | 0.5/1.0 | | | | | |
| Terasil Blue HLB | | | | 0.1 | | | | 0.5 | | 1.0 | | | |
| Blue Mix 32497 | | | | | | 0.1 (5) | | | | 0.5 (5) | 1.0 (5) | 2.0 (4–5) | |
| *Primary Color Yellow, including Orange, Yellow Brown* | | | | | | | | | | | | | |
| Yellow 23 (Intrasil Yellow 5R) | | | | 0.1 | | | | 0.50 | | 1.0 | 1.5/1 2.0 | | |
| Orange 37 (Intrasil Dk Orange 3GH) | | | | 0.1 | | | | | 0.5/1.0 | | | | |
| Brown 19 (Dispersol Brown C-3G) | | | | 0.1 | | | | 0.5 | | 1.0 | | | |
| Yellow 64 (Palanil Yellow 3G 200%) | | | | | | | | | | | | | |
| Yellow Mix | | | | | | 0.1 (5) | | 0.5 (5) | | 1.0 (5) | 2.0 (4–5) | | |

More specifically, the information provided in Table IV dramatically demonstrates the increase in color depth of specific dyes (red mix 2.25.97, blue mix 32497 and yellow mix), and the resultant crock results versus the individual dyestuffs. The data for the dyes with the primary color red demonstrates that the deepest red achievable from individual dyes in about a ⅓ depth with many dyes crocking at depths as low as ¹/₂₅. The red mix 2.25.97 shows excellent crock results even at a 2.5/1 depth, two and a half times deeper than any individual component dyestuff.

It is also possible according to the present invention to select individual dyes for the dye mix as a function of actual build tests. Accordingly, undyed polypropylene samples first may be dyed with a solution having selected disperse dye A, then respective samples each dyed with dye A may be contacted with one of a plurality of solutions each containing disperse dye B, dye C, and dye D, respectively, with each of dyes B, C, and D being from the same primary color group as dye A. All other fastness information being equal, the dye B, C, and D which best builds with selected dye A will then be selected for combining with dye A in the disperse dye mix.

Suitable material for dyeing of the present invention is a polypropylene based polyolefin disclosed in U.S. Pat. Nos. 5,468,259 and 5,550,192, each hereby incorporated by reference. This polypropylene composition, which may be referred to as a modified polypropylene, includes a selected amount of a ethylene copolymer, and preferably an ethylene methyl acrylate copolymer. This material may be disperse dyed according to the present invention in a cost effective manner to result in a dyed fiber which has good light fastness, good wash fastness, and good crocking or bleeding properties.

Although the exact theory for the improved dye results is not known, one possible explanation is that there are three phases of adsorption as the dye builds on the KROMALON:

1. some dye is adsorbed deep into the fiber and finds a place to fix;
2. some dye enters the fiber and producing a color yield improvement, but is not fixed sufficient to withstand the leeching action of surfactants, oil, time and temperature; and
3. some dye has nowhere to go, washes off the dye bath, and if not rinsed well will create a crock problem at the time of dyeing.

It is believed that one of the primary reasons that a dye mix containing a plurality of disperse dyes each within the same primary color group builds well to allow polypropylene to be dyed in very dark shades without crocking problems is that each of the selected dyes performs differently when attaching itself to the polypropylene fibers. In other words, dye A may attach to the fiber in either a mechanical and/or chemical manner which is markedly dissimilar to the manner in which the other dyes within the dye mix attach to the fiber. Accordingly, each of the dyes in the dye mix, provided it is used at a concentration less than its maximum concentration which will result in a crocking problem for the individual dye, may then be combined in a dye mix so that the dyes stack and will result in desired dark shade, but that crocking concentrations of the individual dyes effectively do not stack.

KROMALON may thus be disperse dyed in a long baths or may be dyed continuously by a pad-stream or print-steam method. KROMALON may also be dyed with steamers, which are commonly used in space dyeing. Steam may be injected through steam coils into a water tank which holds the dye bath, thereby resulting in a constant boiling bath and hence steam generation. Ideal steaming conditions are at 100% relative humidity at temperatures of from 210–212° F. Good disperse dye exhaustion may be obtained in some steamers within 3 to 4 minutes for light to medium depths and within 5 to 6 minutes for medium to dark depths. A drier steam is obtained utilizing super heated steam, and this type of steamer has been found to provide good fixation conditions for disperse dyeing of KROMALON. Shorter steaming times are possible when utilizing pressurized saturated steam about 212° F. KROMALON may also be dyed by knit-deknit space printing when the base shade is first padded on the material followed by several print colors. When dyeing KROMALON in the yarn form, it is preferable in most cases to apply a fiber lubricant to the dyed fibers to reduce fiber-to-fiber friction during the deknitting and tufting steps. As explained above, this lubricant needs typically to be considered when dyeing, since the presence of a lubricant on the fibers increases the likelihood of a crocking problem if specific dye concentrations in the mix are not carefully controlled. Since KROMALON melts at a temperature much lower than polyamide fibers, KROMALON may be dried after dyeing at temperatures of less than about 230° F.

Polyolefin material may be dyed successfully by both exhaust and continuous dyeing methods. Polypropylene fibers may be disperse dyed according to this invention in a bath with a ph of from 2.5 to 10.0 and preferably from 4–6. The dye is typically dispersed in 110–120° F. water. Physical factors, such as temperature and agitation, and auxiliary chemicals may be added to the dye bath to alter the rate of dyeing. Agitation of the dye bath speeds dyeing diffusion to the fibers in the dye bath. Continuous dyeing may be carried out by any of a number of currently available methods. These include Solid shades on the Fluidye, and Instacolor machines, and Multicolor processes involving various forms of screen and roller printing, gum layers, and Dye flood applicators. Jet printing, spray dyeing, and a wide variety of multicolor continuous processes can also be used. Different dye solutions may also be jet sprayed onto fabric or carpet made of KROMALON composition. A small amount of defoamer may be used together with other ingredients when employing dyeing pad and print solutions.

If any reductive treatment is used on the dyed KROMALON, it must be much milder than when used on polyester, with a lower concentration of soda ash, and performed at a lower temperature and for a shorter period of time. KROMALON also exhibits thermal migration, which is the time/temperature migration of saturated dye to the surface. This migration is accelerated by temperature, and is further accelerated by most lubricants, oils, and surfactants which are commonly applied to yarns to allow them to process well.

The dye mixes and techniques for selecting dyes may be used in polyolefin materials other than polypropylene. Specifically, the techniques of the present invention may be applied to dyeing polyester fibers of the poly(trimethylene terephthalate) variety as disclosed in a paper entitled "Dyeing and Staining of Poly(trimethylene terephthalate) Carpets."

The following certified AATCC fastness test methods were used to generate the ratings (1 through 5), discussed above; light fastness—AATCC test method 16-1993; crock fastness—AATCC test method 8-1996; color fastness to oxides of nitrogen in the atmosphere under high humidities—AATCC test metod 164-1992; and color fastness to ozone in the atmosphere under high humidities—AATCC test method 129-1996.

Various modifications to the dyed fiber compositions and to the techniques described herein for dyeing fibers should be apparent from the above description of the preferred embodiments. Although the invention has been described in detail for these embodiments, it should be understood that this explanation is for illustration and that the invention is not limited to these embodiments. Alternative compositions and dyeing techniques will thus become apparent to those skilled in the art in view of this disclosure, and such alternative compositions and techniques are performed without departing from the spirit of the invention, which is defined by the claims.

What is claimed is:

1. A method of dyeing a polypropylene based material modified with an ethylene copolymer, comprising:
preparing various disperse dye dispersions each comprising an individual disperse dye at a known dye concentration;
contacting undyed polypropylene material samples with each of the various disperse dye dispersions to produce a plurality of dyed polypropylene material samples;
testing the dyed polypropylene samples to determine crocking the characteristics for each of the various disperse dyes;
for each of various disperse dyes, determining a maximum dye concentration which will produce an acceptable crocking test;
for each of various disperse dyes within a common primary color group, selecting a plurality of disperse dyes each substantially at its determined maximum dye concentration;
combining the selected plurality of disperse dyes to form a primary color dye mix;
preparing a disperse dye mix dispersion from the primary color dye mix; and
contacting undyed polypropylene material with the disperse dye mix dispersion to dye the polypropylene material.

2. The method as defined in claim 1, further comprising:
testing dyed polypropylene material samples to determine a fastness characteristic other than crocking for each of various disperse dyes; and
from the various disperse dyes within a common primary color group, selecting additional disperse dyes each at a concentration below its determined maximum dye concentration and as a function of its determined fastness characteristic other than crocking.

3. The method as defined in claim 2, further comprising:
from the various disperse dyes within a common primary color group, selecting additional disperse dyes each as a function of its determined fastness characteristic other than crocking and the determined fastness characteristics of other selected disperse dyes.

4. The method as defined in claim 1, wherein each of the selected plurality of disperse dyes is combined with other disperse dyes at a concentration of at least 75% of its determined maximum dye concentration.

5. The method as defined in claim 1, wherein each of the plurality of disperse dyes is combined with other selected disperse dyes at a concentration which, when expressed has a percentage of its maximum dye concentration, is within 10% of the percentage of other of the plurality of disperse dyes to their respective maximum dye concentration.

6. The method as defined in claim 1, further comprising:
for each of various disperse dyes within a primary color group, depicting K/S as a function of dye concentration for specific dyes to assist in selecting the plurality of disperse dyes.

7. The method as defined in claim 1, further comprising:
for each of various disperse dyes within a primary color group, depicting standard depth as a function of dye concentration for specific dyes to assist in selecting the plurality of disperse dyes.

8. The method as defined in claim 1, wherein the disperse dyes are each from a blue primary color group and are selected from the group consisting of disperse blue 60, disperse blue 291, disperse blue 118, Terasil blue HLB, disperse blue 87, disperse blue 148, disperse blue 56; and disperse blue 332.

9. The method as defined in claim 1, wherein the polypropylene material is dyed with the dye mix dispersion at atmospheric pressure.

10. The method as defined in claim 1, further comprising:
contacting an undyed polypropylene material sample with a first disperse dye dispersion obtained from a selected first disperse dye; and
after contacting the polypropylene material sample with the first disperse dye dispersion, contacting the dyed sample with another dispersion prepared from a second disperse dye within the same primary color group as the first dye to test the build rate of the first dye and the second dye; and
selecting first and second dyes for dye mix as a function of the build rate test.

11. The method as defined in claim 1, wherein the selected plurality of disperse dyes are each from a yellow primary color group and are selected from the group consisting of disperse yellow 64, disperse yellow 23, disperse brown 19, disperse orange 30, disperse orange 41, disperse orange 37, disperse yellow 3, disperse orange 30, disperse yellow 42, disperse orange 89, disperse yellow 235, disperse orange 3, disperse yellow 54, and disperse yellow 233.

12. The method as defined in claim 1, wherein the disperse dyes are each from red primary color group and are selected from the group consisting of disperse red 60, disperse red 50, disperse red 146, disperse red 127, disperse red 65, disperse red 86, disperse red 191, disperse red 338, disperse red 302, disperse red 13, disperse red 167, and disperse violet 26.

13. The method as defined in claim 1, further comprising:
determining for each selected disperse dye a light fastness characteristic, a fading characteristic, a high humidity ozone characteristic, and a nitrogen oxide characteristic.

14. The method as defined in claim 1, wherein the polypropylene material is dyed by continuously passing the polypropylene material through the disperse dye mix dispersion.

15. A method of dyeing a polypropylene based fiber modified with an ethylene copolymer, comprising:
preparing various disperse dye dispersions each comprising an individual disperse dye at a known dye concentration;
contacting undyed polypropylene fiber samples with each of the various disperse dye dispersions to produce a plurality of dyed polypropylene fiber samples;
testing the dyed polypropylene fiber samples to determine crocking characteristics for each of various disperse dyes;
for each of various disperse dyes, determining the maximum dye concentration which will produce an acceptable crocking test;
for each of various disperse dyes within a common primary color group, selecting a plurality of disperse dyes each at least 75% of its determined maximum dye concentration;
combining the selected plurality of disperse dyes to form a primary color primary color dye mix;
preparing a disperse dye mix dispersion from the primary color dye mix; and
contacting undyed polypropylene fiber material with the disperse dye mix dispersion at atmospheric pressure to dye the polypropylene fiber.

16. The method as defined in claim 15, further comprising:

testing dyed polypropylene fiber samples to determine a fastness characteristic other than crocking for each of various disperse dyes; and from the various disperse dyes within a common primary color group, selecting additional disperse dyes each at a concentration below its determined maximum dye concentration and as a function of its determined fastness characteristic other than crocking.

17. The method as defined in claim 15, wherein each of the plurality of disperse dyes is combined with other selected disperse dyes at a concentration which, when expressed has a percentage of its maximum dye concentration, is within 10% of the percentage of other of the plurality of disperse dyes at their respective maximum dye concentration.

18. The method as defined in claim 15, further comprising:

contacting an undyed polypropylene fiber sample with a first disperse dye dispersion obtained from a selected first disperse dye; and after contacting the polypropylene fiber sample with the first disperse dye dispersion, contacting the dyed sample with another dispersion prepared from a second disperse dye within the same primary color group as the first dye to test the build rate of the first dye and the second dye; and selecting first and second dyes for dye mix as a function of the build rate test.

19. A method of selecting a dye mix for dyeing a polypropylene material modified with an ethylene copolymer, comprising:

preparing various disperse dye dispersions each comprising an individual disperse dye at a known dye concentration;

contacting undyed samples of the polypropylene material with each of the various disperse dye dispersions to produce a plurality of dyed polypropylene material samples;

testing the dyed samples to determine crocking characteristics for each of the various disperse dyes;

for each of various disperse dyes, determining the maximum dye concentration which will produce an acceptable crocking test;

for each of various disperse dyes within a common primary color group, selecting a plurality of disperse dyes each having a concentration of at least 75% of its determined maximum dye concentration; and combining the selected plurality of disperse dyes to form a primary color dye mix.

20. The method as defined in claim 19, further comprising:

testing dyed samples to determine a fastness characteristic other than crocking for each of various disperse dyes; and from the various disperse dyes within a common primary color group, selecting additional disperse dyes each at a concentration below its determined maximum dye concentration and as a function of its determined fastness characteristics other than crocking.

21. The method as defined in claim 19, wherein each of the selected plurality of disperse dyes is combined with other disperse dyes at a concentration of at least 75% of its determined maximum dye concentration.

22. The method as defined in claim 19, wherein each of the plurality of disperse dyes is combined with other selected disperse dyes at a concentration which, when expressed has a percentage of its maximum dye concentration, is within 10% of the percentage of other of the plurality of disperse dyes at their respective maximum dye concentration.

23. The method as defined in claim 19, further comprising:

contacting an undyed polypropylene sample with a first disperse dye dispersion obtained from a selected first disperse dye; and after contacting the undyed sample with the first disperse dye dispersion, contacting the dyed sample with another dispersion prepared from a second disperse dye within the same primary color group as the first dye to test the build rate of the first dye and the second dye; and selecting first and second dyes for dye mix as a function of the build rate test.

24. The method as defined in claim 19, wherein the selected plurality of disperse dyes are each from a yellow primary color group and are selected from the group consisting of disperse yellow 64, disperse yellow 23, Palanil yellow HM, disperse brown 19, disperse orange 30, disperse orange 41, disperse orange 37, disperse yellow 3, disperse orange 30, disperse yellow 42, disperse orange 89, disperse yellow 235, disperse orange 3, disperse yellow 54, and disperse yellow 233.

25. The method as defined in claim 19, wherein the disperse dyes are each from red primary color group and are selected from the group consisting of disperse red 60, disperse red 50, disperse red 146, disperse red 127, disperse red 65, disperse red 86, disperse red 191, disperse red 338, disperse red 302, disperse red 13, disperse red 167, and disperse violet 26.

26. The method as defined in claim 19, wherein the disperse dyes are each from a blue primary color group and are selected from the group consisting of disperse blue 60, disperse blue 291, disperse blue 118, disperse blue 87, disperse blue 148, disperse blue 56, and disperse blue 332.

27. A dye mix produced by the method of claim 19.

28. The dye mix of claim 27 for dyeing a polypropylene based material modified with an ethylene copolymer, comprising:

a plurality of disperse dyes in an aqueous dispersion, each of the disperse dyes being within a common primary color group, each of two or more of the plurality of disperse dyes being at a concentration which is at least about 70% of its individual maximum acceptable crocking concentration for the respective disperse dye when dyeing the polypropylene based material, and a sum of the concentrations for the plurality of disperse dyes being substantially greater than the acceptable crocking concentration for each of the individual dyes within the dye mix.

29. The dye mix as defined in claim 28, wherein the selected plurality of disperse dyes are each from a yellow primary color group and are selected from the group consisting of disperse yellow 64, disperse yellow 23, disperse brown 19, disperse orange 30, disperse orange 41, and disperse orange 37, disperse yellow 3, disperse orange 30, disperse yellow 42, disperse orange 89, disperse yellow 235, disperse orange 3, disperse yellow 54, and disperse yellow 233.

30. The dye mix as defined in claim 28, wherein the disperse dyes are each from red primary color group and are selected from the group consisting of disperse red 60, disperse red 50, disperse red 146, disperse red 127, disperse red 65, disperse red 86, disperse red 191, disperse red 338, disperse red 302, disperse red 13, disperse red 167, and disperse violet 26.

31. The dye mix as defined in claim 28, wherein the disperse dyes are each from a blue primary color group and are selected from the group consisting of disperse blue 60, disperse blue 291, disperse blue 118, disperse blue 87, disperse blue 148, disperse blue 56, and disperse blue 332.

32. The dye mix as defined in claim 28, wherein the concentration of each of the two or more of the plurality of disperse dyes is at least 75% of its individual maximum acceptable crocking concentration.

33. A method of dyeing a polypropylene based material modified with an ethylene copolymer, the method comprising:

preparing a disperse dye aqueous dispersion comprising a plurality of individual disperse dyes each within a primary color group, each of two or more of the plurality of disperse dyes being at a concentration which is at least about 70% of its individual maximum acceptable crocking concentration for the respective disperse dye when dyeing the polypropylene based material, and a sum of the concentrations for the plurality of disperse dyes being substantially greater than the acceptable crocking concentration for each of the individual dyes within the dye mix; and contacting the polypropylene based material with the disperse dye dispersion to dye the polypropylene based material.

34. The method as defined in claim 33, wherein the concentration of each of the two or more of the plurality of disperse dyes at least 75% of its individual maximum acceptable crocking concentration.

35. A dye mix of selected disperse dyes within a primary color group for use in an aqueous mixture to dye polypropylene modified with an ethylene copolymer, the ratio of the dyes in the mixture determined by testing the crockfastness and lightfastness of the individual dyes on said modified polypropylene and selecting a mixture which provides excellent fastness and buildup properties on said modified polypropylene.

* * * * *